2,965,930
Patented Dec. 27, 1960

2,965,930
PROCESS FOR PREPARING POLYEPOXIDE SOLDER

Millard Nelson Paul, Boundbrook, N.J., assignor to Union Carbide Corporation, a corporation of New York No Drawing. Filed Aug. 21, 1957, Ser. No. 679,517

7 Claims. (Cl. 18—47.5)

This invention relates to the preparation of heat hardenable compositions suitable for use as solid solders. More specifically, this invention relates to a process for the preparation of solid, heat hardenable polyepoxide solders.

Metal surfaces having dents or cracks have been coated with various types of solders in order to fill in the imperfections. Of the various resin type solders which have been proposed, those containing polyepoxides have been found most suitable. The polyepoxide solders form a coating patch on metal surfaces of good adhesion, low shrinkage, low toxicity, high toughness and good paintability. Up until the present time, however, the polyepoxide stick or solid solders have presented a serious limitation which has negated their extensive use. Current day polyepoxide solders contain a number of large voids and pits, ranging in diameter size up to ¼ inch, which remain readily discernible even after the solder has been applied to a metal surface. These voids form areas which peel and flake, especially if present at the finished seam or joint.

It has been found necessary, therefore, to fill in these voids by a subsequent finishing operation in order to obtain a smooth and uniformly glossed coating which blends with the metal surface and one which does not readily peel and flake. This subsequent finishing operation adds to the cost and time required in order to complete the entire patching operation and is particularly undesirable in the continuous production lines of the automotive industry.

The large voids and pits present in such solders are occasioned by entrapped air forming air holes in the solder as it is being prepared. A number of different techniques have been investigated in an attempt to solve this problem. Among the techniques tried without success has been the use of materials which have been ostensibly "air free." Another process has suggested the mixing of materials while these materials are in a heated condition. These and other processes have been tried without any appreciable success.

I have now discovered a process for preparing solid polyepoxide solders, free of large voids and pits, which comprises partially advancing or curing a polyepoxide resin, which may contain a filler, to a hard and brittle but still fusible condition, comminuting the brittle resin, and then shaping the material preferably into stick form by compacting the comminuted resin particles together by the application of sufficient pressure to form a solid, dense, self sustaining structure, free from all discernible large voids and pits and characterized by a microporosity cell structure not exceeding about 75 microns in diameter.

My process leads to the production of solid polyepoxide solders which form homogeneous, smooth, long lasting coatings which have uniformity of strength and do not peel or flake. My solder is highly advantageous as no subsequent finishing operation is necessary once the solder has been applied.

For purposes of this invention the brittle but still fusible stage is defined to mean that stage where the polyepoxide curing reaction has not proceeded very far and the composition is still capable of being softened by heat and is also capable of flowing. The composition at this stage, although plastic while hot, is hard and brittle when cold and fractures very readily when struck by a blow.

The polyepoxides useful in the preparation of the novel solders of the invention comprise those organic compounds containing more than one reactive epoxy group

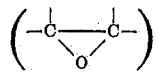

in their molecule. The polyepoxides may be saturated or unsaturated, aliphatic, cycloaliphatic, aromatic or hetero-cyclic and may be substituted with non-interfering substituents. The polyepoxide may be either monomeric or polymeric. The epoxy group may either be in the terminal location or be present as an interior group.

In referring to polyepoxides, reference is made to their epoxy equivalency. The term "epoxy equivalency" refers to the grams of polyepoxide containing 1 gram-mole of epoxide. The epoxy equivalency is calculated by dividing the average molecular weight of the polyepoxide compound by the epoxide equivalent weight. The epoxy equivalency is determined by introducing into a pressure bottle containing 25 ml. of 1 N pyridine hydrochloride in chloroform an amount of epoxide sample calculated to react with about 50% of the pyridine hydrochloride. The bottle is then sealed and the contents heated in a steam bath for a period of one hour. At the end of this time the bottle and contents are cooled and 10 drops of phenol-phthalein indicator added (1.0 gram of phenolphthalein per 100 ml. of 60% ethanol). The mixture is titrated to a permanent red end point with a standard 0.2 N alcoholic potassium hydroxide solution. A blank is also run in precisely the same fashion without, however, the inclusion of a sample. From the titration data obtained, the amount of pyridine hydrochloride consumed by reaction with the epoxide sample can be calculated and from this data the epoxy equivalency can be determined. If the polyepoxides are single monomeric compounds having all their epoxide groups intact their epoxide content will be whole numbers such as 2, 3, 4, 5, etc. per each polyepoxide molecule. In the case of polymeric polyepoxides the materials may contain some of the monomeric monoepoxides or have their epoxy groups hydrated or otherwise reacted and/or contain higher molecular weight molecules so that the epoxide content may be low and contain fractional values. The polymeric material may, for example, have epoxide content values such as 1.5, 1.8, etc.

The monomeric type polyepoxide may be exemplified by the following: bis (2,3-epoxycyclopentyl)ether and glycidyl 2,3-epoxycyclopentyl ether. Other monomeric polyepoxides include the glycidyl polyethers of polyhydric phenols obtained by reacting a polyhydric phenol with an excess amount, i.e., 3 to 6 moles per each phenolic hydroxyl group, of an epihalohydrin in an alkaline medium. Among such glycidyl polyethers may be mentioned the diglycidyl ether of bis(4-hydroxy phenyl) dimethylmethane and diglycidyl ether of bis(4-hydroxy phenyl)methane.

Illustrative of the polymeric type polyepoxides are the glycidyl polyethers of polyhydric phenols obtained by reacting, in an alkaline medium, a polyhydric phenol and a slight stoichiometric excess, i.e., .5 to 2 moles, of epichlorohydrin per each phenolic hydroxyl group. An example of this particular type compound is the polyether obtained on reacting 1 mole of bis(4-hydroxy phenyl)dimethylmethane with 1.5 moles of epichlorohydrin.

The polyepoxides may be used singly or in combinations of 2 or more.

The more viscous polyepoxides such as the glycidyl polyethers of polyhydric phenols need to be fluidized prior to admixing with a curing material and also the curing agent throughout the composition. This may be successfully accomplished by simply admixing and vigorously agitating the viscous polyepoxide with a liquid monoepoxy, generally not in excess of about 15 parts diluent per each 100 parts polyepoxide compound until a homogeneous, pourable mix is obtained. The monoepoxy compound reacts in the same manner as the polyepoxide compound and therefore the reactive diluent does not adversely affect the properties of the composition. The fluidity imparted by these reactive diluents enables an adequate dispersion of the filler material and curing agent throughout the polyepoxide compositions.

The monoepoxy compound which can be used as a reactive diluent is a liquid at room temperature, has a low viscosity and is preferably free of any other groups which would react with the polyepoxide. The epoxy group may either be in the terminal location or be present as an interior group. Among the reactive diluents may be mentioned propylene oxide, butylene oxide, isobutylene oxide, butadiene monoxide, 1,2-pentylene oxide, 2,3-hexylene oxide, 3,4-hexylene oxide, 3 ethyl 2,3-pentylene oxide, epichlorohydrin, epibromohydrin, octylene oxide, styrene oxide, glycidyl oxide, and decylene oxide.

The preferred monoepoxy diluents, however, are those having a boiling point above 100° C. at atmospheric pressure. Illustrative of members of this class are the monoglycidyl ethers including methyl, ethyl, isopropyl, allyl, butyl, crotyl, isoamyl, phenyl, o-tolyl, p-tolyl, thymyl and naphthyl glycidyl ethers.

The amount of monoepoxy compound utilized to fluidize the glycidyl polyethers will vary and be dependent on the viscosity of the glycidyl ether and also on the viscosity of the monoepoxy compounds. As previously stated the monoepoxy diluent are generally used in amounts not exceeding about 15 parts per each 100 parts polyepoxide. It is sufficient for this invention that the amount of monoepoxy compound added fluidize the glycidyl polyethers to an extent such that uniform distribution of the filler material and curing agent is effected throughout the polyepoxide composition.

In lieu of utilizing a fluidizing agent, the polyepoxides may be heated to a fluid consistency and then admixed with a filler and curing agent.

The polyepoxides are cured by two general types of curing agents, a hardener or a catalyst. The hardener undergoes a reaction with the epoxy compound itself. Generally, the hardener is added in amounts sufficient to react with all of the epoxide groups present in the polyepoxide and the monoepoxy diluent. For example, when using an amine hardener, sufficient amount is added to provide about one amino hydrogen per each epoxy group. Among the amine hardeners may be mentioned m-phenylene diamine, 4,4'-methylene dianiline, N(2-hydroxy-2,4,4-trimethylpentyl)diethylene triamine, N(2-hydroxy 2-phenyl-ethyl)diethylene triamine, and meta-xylene diamine. Illustrative of the polyhydric phenols and acid anhydride hardeners are 2,3-bisphenol propane, hexahydrophthalic acid anhydride, chlorendic anhydride, methyl endocisbycyclo(2,2,1)-5 heptane 2,3-dicarboxylic anhydride.

Catalysts, on the other hand, are compounds that primarily cause the polyepoxide to self-polymerize. They can be mono or polyfunctional and are used in amounts less than the stoichiometric. Illustrative of such catalysts may be noted alpha methyl benzyl dimethylamine, diethylaminopropylamine, dimethylaminoethylphenol, methyl benzyl dimethylamine, pyridine, piperidine and dimethylaminoethylphenol.

The curing agents may be used singly or in a combination of 2 or more.

The inert, finely-divided fillers which may be used in the polyepoxide solders of this invention include among others, powdered aluminum, powdered iron, powdered alumina, Portland cement, silica carbide, iron oxide, nylon, silica and mica. The filler materials may also be used singly or in combinations of 2 or more. Usually the particles of the filler materials are of a size ranging from about 60 to 325 mesh.

The amount of filler added to the polyepoxide composition may vary over a wide range. I prefer to use an amount of filler ranging from 0 to about 300 parts by weight per 100 parts by weight of polyepoxide and curing agent.

An amount of filler in substantial excess of 300 parts by weight per 100 parts by weight of the polyepoxide and curing agent increases the temperature necessary to cause the composition to flow and cure to above 150° C. At such temperatures and above any low boiling components, such as phenyl glycidyl ether, butyl glycidyl ether, ethyl glycidyl ether, which may be present in the composition, will volatilize causing large voids and pits to form in and at the surface of the polyepoxide composition.

Apart from the practical economics of using a relatively inexpensive filler with a corresponding decrease in the amount of relatively expensive polyepoxide, the filler material not only aids in controlling the flow of the composition, but also aids in the transfer of heat throughout the body of the solder when a heated member is applied to the surface of the solder in order to make it flow and cure. A metallic filler is also desirable as it gives a solder a metallic appearance which blends well with the metal surface, adds body and strength to the solder and helps in decreasing the wear and tear of the solder due to any buffing operation to which the patched metal surface may be subjected. The metal filler materials also bring the coefficient of expansion of the solder close to the coefficient of expansion of the metal surface so that there is no undue difference in expansion of the metal surface versus the solder patch.

Generally, my process is conducted by admixing a polyepoxide, a suitable curing agent and a filler material at room temperature to form a homogeneous pourable blend. To insure a thorough dispersion of the filler material and curing agent throughout the polyepoxide, the mixture is usually milled in a two or three roll paint mill. The homogeneous mixture is then preferably formed into thin sheets, allowed to advance, preferably at room temperature to a fusible resinous mass which shatters upon being struck but which is still capable of being worked under heat or heat and pressure.

In allowing the polyepoxide to advance to a brittle and fusible state at room temperature, care is taken to prevent such a buildup of heat that would cause the composition to cure to an infusible product. To prevent such a buildup, we prefer to cast the composition after mixing, into thin sheets of approximately ¼ inch in thickness. Any heat buildup is quickly dissipated to the surroundings and consequently there is insufficient heat for the composition to advance to an infusible product.

It is also advantageous to form the polyepoxide into thin sheets as the sheeting operation tends to eliminate the entrapment of air within the composition. As has been previously pointed out, entrapped air causes the formation of the undesirable large voids and pits in the polyepoxide composition.

The polyepoxide compositions may be formed into sheets by a number of different ways. Among the conventional processes which can be conveniently employed are casting into molds, extruding or calendering.

The mixture, before it attains the infusible and insoluble stage, passes through a series of fusible resin states of progressively increasing viscosity and progressively higher softening temperatures. In these intermediate resin stages the composition is soluble in such solvents as acetone, methyl ethyl ketone, chloroform and trichloroethylene, with the solubility decreasing progressively as the mixture further reacts to approach the infusible stage. The workable stage of this invention is that stage or series of stages wherein the composition is hard, brittle and fusible.

An inclined plane can be conveniently used to determine whether or not the material has advanced beyond the fusible state. In this test ½ gram polyepoxide pellets are placed on a horizontal metal plate which is maintained at a temperature of 125° C. The plate is kept at a horizontal position for 2 minutes after which the plate with the pellet still in place is inclined at an angle of 45° C. and kept in this position for 20 minutes. If the material is in the fusible state it will either flow or sag. On the other hand, if the material has reached the infusible state, it will neither flow nor sag.

The compositions of this invention, in a stage where they can be readily worked into a desired shape, have a flow or sag ranging from about 5 to 60 millimeters as determined by the inclined plate test.

The following tabulated data typically illustrates the amount of flow of a composition in the fusible and brittle state, as determined by the inclined plane test, comprising a glycidyl polyether of bis(4-hydroxy phenyl)dimethylmethane containing as the principal product the monomeric diglycidyl ether and having an epoxy equivalency of 185, 19 parts by weight of a hardener comprising a mixture of 60 parts by weight of m-phenylene dianiline, 40 parts by weight of 4,4'-methylene dianiline and 6 parts by weight of bis(4-hydroxy phenyl) dimethylmethane, commonly known as Bisphenol A, and amounts of powdered aluminum filler of 325 mesh varying from 0% to 75% by weight based on the amount of polyepoxide.

In each instance the polyepoxide, hardener and filler material were admixed and milled in a conventional three roll paint mill to form a homogeneous, pourable mix. The mix was thereafter poured or cast into molds thereby forming sheets having a thickness of ¼ inch. The sheeted material was permitted to advance to a fusible and brittle state at room temperature.

| Percent of filler based on the amount of polyepoxide present | Flow determined when the composition became hard and brittle, mm. | Flow determined after material had been allowed to cure at room temperature for 5 days, mm. |
|---|---|---|
| 0 | 50 | 10 |
| 25 | 35 | 10 |
| 50 | 25 | 10 |
| 75 | 15 | 10 |

After the sheeted material has advanced to the fusible and brittle stage, it is formed into particulate material by comminuting on a conventional grinding mill or micropulverizer at room temperature to a powder of about 60 mesh. Thereafter the powder is compacted into the desired shape at room temperature in a conventional compression molding or tableting machine under a pressure sufficient to form a dense, self sustaining product characterized by a micro porosity and containing no discernible large voids and pits.

The grinding of the composition into particulate form insures the elimination of any air which may have been entrapped in the composition. By subsequently compacting the material to a product characterized by micro porosity, no voids or pits, discernible to the naked eye, are present which need be filled in a subsequent finishing operation once the solder has been applied as a coating patch.

The actual pressure required to compact the polyepoxide composition will depend on the specific composition which is being worked. The higher the pressure the less porous will be the structure. For purposes of this invention the pressure need be sufficient to form a dense, self sustaining product characterized by micro porosity pore size not exceeding about 75 microns in diameter.

The material, once compacted into the desired shape is ready for use. It is free from all discernible voids and pits, can be stored for 10 to 12 days at room temperature without reaching an unworkable infusible state. Under refrigeration the material will remain fusible and workable for even longer periods of time.

The following examples are illustrative of the applicant's invention.

Example I 100 parts of a glycidyl polyether of bis(4-hydroxy phenyl)dimethylmethane comprising essentially the monomeric diglycidyl ether of bis(4-hydroxy phenyl)dimethylmethane, having an epoxy equivalency of 185 and viscosity of 10,500 centipoises, were admixed at room temperature with 19 parts by weight of a liquid hardener comprising a mixture of 60 parts by weight of m-phenylene diamine, 40 parts by weight of 4,4'-methylene dianiline and 6 parts by weight of bis(4-hydroxy phenyl) dimethylmethane and with 200 parts by weight of a powdered aluminum filler having a particle size of 325 mesh. The mix was milled, at room temperature, on a three roll paint mill to a homogeneous smooth, pourable blend and cast into sheets of ¼ inch thickness. The sheeted material was permitted to advance to a brittle but still fusible state at room temperature. This state was evidenced by an observable increase in the hardness of the material which also fractured easily when subjected to a grinding operation with mortar and pestle. The time required for this particular composition to reach the brittle but still fusible state was 12 hours. The material was thereafter ground, in a conventional micro-pulverizer at room temperature, into a powder having a particle size of 60 mesh. The powder was then formed into tablets in a conventional compression molding or tableting apparatus operated at 25,000 lbs. per square inch. The resultant tablets were ⅜ inch in diameter and had a thickness of ¼ inch. The tablets were dense, hard self sustaining and had a pore size of less than about 75 microns in diameter. The specific gravity of each tablet was 1.2 at 25° C.

The flow and cure characteristics of each tablet were determined by first heating a metal surface by contacting the said surface with a hot plate maintained at a temperature of 250° C. A tablet was placed on the prewarmed metal surface and a second hot plate weighing 4 lbs. and having a temperature of 250° C. was brought into contact with the upper surface of the tablet. The tablet began to flow after 10 seconds. The tablet was pressed to a thickness of ⅛ of an inch and cured for 4 minutes. The solder patch was then allowed to cool to room temperature. The patch had an extremely high gloss surface which was completely free of large voids and pits. No further finishing operation was required.

The strength of the cured solder was determined to be as follows:

Heat distortion (in degrees centigrade)____°C__ 130
Ultimate compressive (lbs. per sq. inch)_____ 30,000
Compressive yield (lbs. per sq. inch)_____ 20,000
Flexural (lbs. per sq. inch)_____ 18,000
Rockwell hardness (M scale)_____ 100

In contrast to the solder compositions of my invention, the polyepoxide formulation of Example I was used to prepare a stick solder using a current day procedure. The components were admixed at room temperature and passed once through a conventional three roll paint mill. The mix was thereafter cast into molds ½" x ½" x 4". The material in the individual molds advanced at room temperature to a fusible and brittle state in 16 hours. The solder sticks prepared by this method contained a number of large voids and pits ranging in size up to ¼ inch in diameter, not only at the surface but also throughout the body of the solder. On applying the solder to a metal surface, using the procedure outlined in Example I, surface voids were readily discernible and a subsequent finishing operation was necessary in order to fill in the voids.

*Example II*

One hundred parts by weight of a glycidyl ether of bis(4-hydroxy phenyl)dimethylmethane, comprising essentially the monomeric diglycidyl ether of bis(4-hydroxy phenyl)dimethylmethane, having an epoxy equivalency of 185 and a viscosity of 10,500 centipoises, were admixed with 19 parts by weight of a liquid hardener comprising a mixture of 60 parts by weight of m-phenylene diamine, 40 parts by weight of 4,4'-methylene dianiline, 6 parts by weight of bis(4-hydroxy phenyl)dimethylmethane and 200 parts by weight of a powdered iron filler having a mesh of 325. The mix was milled on a three roll paint mill to a homogeneous, smooth, pourable blend and thereafter cast into sheets of ¼ inch thickness. The sheeted material was allowed to advance to a brittle but still fusible state at room temperature and then comminuted into a powder of 60 mesh. The powder was thereafter cold pressed into individual tablets in a compression molding or tableting apparatus at room temperature using a pressure of 25,000 pounds per square inch. Each tablet measured ⅜" in diameter and was ¼" thick. The tablets were completely free of large voids and pits. The pore size of the tablets was on the order of about 75 microns. No subsequent finishing operation was necessary after application to a metal surface using the procedure defined in Example I. The strengths and properties of this composition were comparable to those of a composition of Example I.

*Example III*

Fifty parts by weight of glycidyl polyether containing as the principal product the monomeric diglycidyl ether of bis(4-hydroxy phenyl)dimethylmethane, having an epoxy equivalency of 185, and viscosity of 10,500 centipoises and 50 parts by weight of a long chain polyether reaction product of bis(4-hydroxy phenyl)dimethylmethane and epichlorohydrin having an epoxy equivalency of 500, prepared by reacting 1 mole of phenol with 1.5 moles of epichlorohydrin in an alkaline medium, were admixed with 13.5 parts by weight of a liquid hardener comprising a mixture of 60 parts by weight of m-phenylene diamine, 40 parts by weight of 4,4'-methylene dianiline and 6 parts by weight of bis(4-hydroxy phenyl)dimethylmethane and 200 parts by weight of powdered iron of 325 mesh.

The mix was passed through a three roll paint mill, thereby forming a homogeneous, smooth pourable blend and thereafter cast into thin sheets approximately ¼ inch in thickness. The sheeted material was allowed to advance to a fusible and brittle state at room temperature. The material was thereafter comminuted into a powder of 60 mesh and thereafter the powder was cold pressed into individual tablets in a compression molding or tableting apparatus at room temperature at a pressure of 25,000 pounds per square inch. Each tablet measured ⅜ inch in diameter and ¼ inch in thickness. The tablets were free of large voids and pits and had a pore size on the order of about 75 microns. No subsequent finishing operation was necessary after application to a metal surface using the procedure outlined in Example I.

The strengths and properties of this composition were comparable to those of Example I.

*Example IV*

One hundred parts by weight of a glycidyl polyether of bis(4-hydroxy phenyl)dimethylmethane containing as the principal product the monomeric diglycidyl ether of bis(4-hydroxy phenyl) dimethylmethane, having an epoxy equivalency of 185 and a viscosity of 10,500 centipoises, were admixed with 19 parts by weight of a liquid hardener comprising a mixture of 60 parts by weight of m-phenylene diamine, 40 parts by weight of 4,4'-methylene dianiline and 6 parts by weight of bis-(4-hydroxy phenyl) dimethylmethane and 200 parts by weight of powdered aluminum of 325 mesh. The mix was thereafter passed through a three roll paint mill forming a homogeneous, smooth, pourable blend and thereafter cast into sheets having a thickness of ¼ inch. The sheeted material was allowed to advance at room temperature to a fusible and brittle state and then ground into a powder of 60 mesh. The powder was thereupon pressed into the form of discs each having a diameter of 1½ inches by cold pressing in a steel mold at a pressure 25,000 pounds per square inch. The discs were free of large voids and pits and characterized by a pore size of about 75 microns. No finishing operation was necessary after the solder was applied to a metal surface by a process as set forth in Example I. The strengths and properties of this composition were comparable to those of the composition of Example I.

What is claimed is:

1. Process for preparing a solid polyepoxide solder which comprises forming into a sheet a heat hardenable polyepoxide composition containing a polyepoxide having more than one

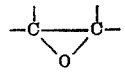

group per molecule, allowing said sheeted material to advance to a fusible and brittle state, comminuting said sheet to form particulate material and thereafter cold forming said particulate material into a self-sustaining, shaped article characterized by a microporosity pore size not exceeding about 75 microns in diameter by subjecting said particulate material to a pressure of about 25,000 p.s.i.

2. Process as defined in claim 1 wherein the polyepoxide is the diglycidyl ether of bis(4-hydroxyphenyl) dimethylmethane.

3. Process for preparing a solid polyepoxide solder which comprises fluidizing a polyepoxide containing more than one

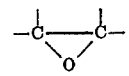

group per molecule, admixing said fluidized polyepoxide with a filler and a curing agent for said polyepoxide, forming said mixture into the form of a sheet, allowing said sheeted material to advance to a fusible and brittle state, comminuting said sheet to form particulate material and thereafter cold forming said particulate material into a self-sustaining, shaped article characterized by a microporosity pore size not exceeding about 75 microns in diameter by subjecting said particulate material to a pressure of about 25,000 p.s.i.

4. Process as defined in claim 3 wherein the fluidizing of the polyepoxide is accomplished by admixing the said polyepoxide with butyl glycidyl ether.

5. Process as defined in claim 3 wherein the filler material is powdered aluminum.

6. Process as defined in claim 3 wherein the filler material is powdered iron.

7. Process as defined in claim 3 wherein the curing agent comprises a mixture of m-phenylene diamine, 4,4'- methylene dianiline and bis(4-hydroxy phenyl) dimethylmethane.

References Cited in the file of this patent

UNITED STATES PATENTS

| | | |
|---|---|---|
| 2,506,486 | Bender et al. | May 2, 1950 |
| 2,516,295 | Borton et al. | July 25, 1950 |
| 2,528,932 | Wiles et al. | Nov. 7, 1950 |
| 2,528,934 | Wiles | Nov. 7, 1950 |
| 2,755,509 | Smidth | July 25, 1956 |
| 2,774,747 | Wolfson et al. | Dec. 18, 1956 |

FOREIGN PATENTS

| | | |
|---|---|---|
| 133,819 | Australia | July 15, 1946 |

OTHER REFERENCES

"Araldite," British Plastics, November 1948, pp. 521–7.